(12) United States Patent
Matsumura

(10) Patent No.: US 10,983,497 B2
(45) Date of Patent: Apr. 20, 2021

(54) MOTOR CONTROL SYSTEM AND INPUT AND OUTPUT DEVICE

(71) Applicant: KABUSHIKI KAISHA YASKAWA DENKI, Kitakyushu (JP)

(72) Inventor: Isamu Matsumura, Kitakyushu (JP)

(73) Assignee: KABUSHIKI KAISHA YASKAWA DENKI, Kitakyushu (JP)

(*) Notice: Subject to any disclaimer, the term of this patent is extended or adjusted under 35 U.S.C. 154(b) by 0 days.

(21) Appl. No.: 16/585,015

(22) Filed: Sep. 27, 2019

(65) Prior Publication Data

US 2020/0089186 A1     Mar. 19, 2020

Related U.S. Application Data

(63) Continuation of application No. PCT/JP2017/012286, filed on Mar. 27, 2017.

(51) Int. Cl.
*B62D 5/065* (2006.01)
*G05B 19/21* (2006.01)

(52) U.S. Cl.
CPC .... *G05B 19/21* (2013.01); *G05B 2219/21063* (2013.01)

(58) Field of Classification Search
CPC .......... G05B 19/21; G05B 2219/21063; B62D 5/065
See application file for complete search history.

(56) References Cited

U.S. PATENT DOCUMENTS

| 6,049,744 A | 4/2000 | Kinoshita et al. |
| 6,092,618 A * | 7/2000 | Collier-Hallman .... B62D 5/065 |
| | | 180/422 |

(Continued)

FOREIGN PATENT DOCUMENTS

| EP | 0913317 A2 | 6/1999 |
| JP | 08-241111 | 9/1996 |

(Continued)

OTHER PUBLICATIONS

International Search Report for corresponding International Application No. PCT/JP2017/012286, dated Jun. 27, 2017.

(Continued)

*Primary Examiner* — Cortez M Cook
(74) *Attorney, Agent, or Firm* — Mori & Ward, LLP

(57) ABSTRACT

A motor control system includes a mechanical apparatus configured to be driven by a motor, a position detector configured to detect position information of the motor, circuitry configured to control the motor, at least one sensor configured to detect information relating to at least one of the mechanical apparatus and the motor, and an input and output device including input-and-output connectors. The position detector and the input and output device are connected to the circuitry through a same communication path. The at least one sensor is connected to the input-and-output connectors of the input and output device. The position information is configured to be transmitted from the position detector to the circuitry. The information relating to the at least one of the mechanical apparatus and the motor is configured to be transmitted from the at least one sensor to the circuitry through the input and output device.

3 Claims, 2 Drawing Sheets

(56) References Cited

U.S. PATENT DOCUMENTS

| | | | |
|---|---|---|---|
| 8,698,441 B2 | 4/2014 | Ogura | |
| 9,488,497 B2 | 11/2016 | Nakai | |
| 2011/0043144 A1* | 2/2011 | Ueda | B62D 5/046 318/400.02 |

FOREIGN PATENT DOCUMENTS

| | | |
|---|---|---|
| JP | 10-105206 | 4/1998 |
| JP | 2001-022419 | 1/2001 |
| JP | 2011-161649 | 8/2011 |
| JP | 2015-216799 | 12/2015 |

OTHER PUBLICATIONS

Japanese Office Action for corresponding JP Application No. 2017-536034, dated Oct. 10, 2017 (w/ English machine translation).
Japanese Office Action for corresponding JP Application No. 2017-536034, dated Feb. 27, 2018 (w/ English machine translation).
Extended European Search Report for corresponding EP Application No. 17903576.1-1202, dated Oct. 9, 2020.

* cited by examiner

MOTOR CONTROL SYSTEM AND INPUT AND OUTPUT DEVICE

TECHNICAL FIELD

The present disclosure relates to a motor control system and an input and output device.

BACKGROUND ART

Patent Literature 1 discloses a system in which a plurality of sensors are connected to an interface unit through respective communication paths, and a detection signal of each of the sensors is transmitted to a host controller or a motor control apparatus via a network that connects the host controller and the motor control apparatus to each other.

Patent Literature 2 discloses a system in which a peripheral device that sets a parameter of a motor control apparatus or performs monitoring of the motor control apparatus through a communication unit in the motor control apparatus is connected.

CITATION LIST

Patent Literature

Patent Literature 1: JP H8-241111 A
Patent Literature 2: JP H10-105206 A

SUMMARY OF INVENTION

Technical Problem

However, there is a problem in that each sensor or each peripheral device is connected to a motor control apparatus, and thus a physical or processing cost tends to increase, in the motor control system in the related art.

The present disclosure has been made in consideration of the above circumstances, and an object of the present disclosure is to provide a motor control system and an input and output device, in which it is possible to reduce a physical or processing cost.

Solution to Problem

According to a first aspect of the present disclosure, a motor control system includes a mechanical apparatus configured to be driven by a motor, a position detector configured to detect position information of the motor, circuitry configured to control the motor, at least one sensor configured to detect information relating to at least one of the mechanical apparatus and the motor, and an input and output device including input-and-output connectors. The position detector and the input and output device are connected to the circuitry through a same communication path. The at least one sensor is connected to the input-and-output connectors of the input and output device. The position information is configured to be transmitted from the position detector to the circuitry. The information relating to the at least one of the mechanical apparatus and the motor is configured to be transmitted from the at least one sensor to the circuitry through the input and output device.

According to the second aspect of the present disclosure, an input and output device includes a plurality of input-and-output connectors configured to be connected to at least one sensor configured to detect information relating to at least one of a motor and a mechanical apparatus configured to be driven by the motor. The input and output device is configured to be connected to a circuitry through a same communication path as a communication path of a position detector configured to detect position information of the motor. The input and output device is configured to transmit the information relating to at least one of the mechanical apparatus and the motor, which has been acquired from the at least one sensor, to the circuitry through the communication path.

Advantageous Effects of Invention

According to the present disclosure, it is possible to provide motor control system and an input and output device, in which it is possible to reduce a physical or processing cost.

DESCRIPTION OF EMBODIMENTS

According to the viewpoint of the inventor of the present invention, sensing of an operation situation in a motor control system has become more important in recent years. However, if the number of sensors increases, a physical cost for the number of wires and the like and a processing cost for traffic, processing loads, and the like increase. In particular, in a case where sensing is performed in real time, the costs tend to increase.

As a result of intensive research and development to reduce the costs in the motor control system, the inventor of the present invention has conceived of a new and unique motor control system. Hereinafter, an example of a motor control system 1 according to an embodiment will be described with reference to FIGS. 1 to 3C.

Figure 1:
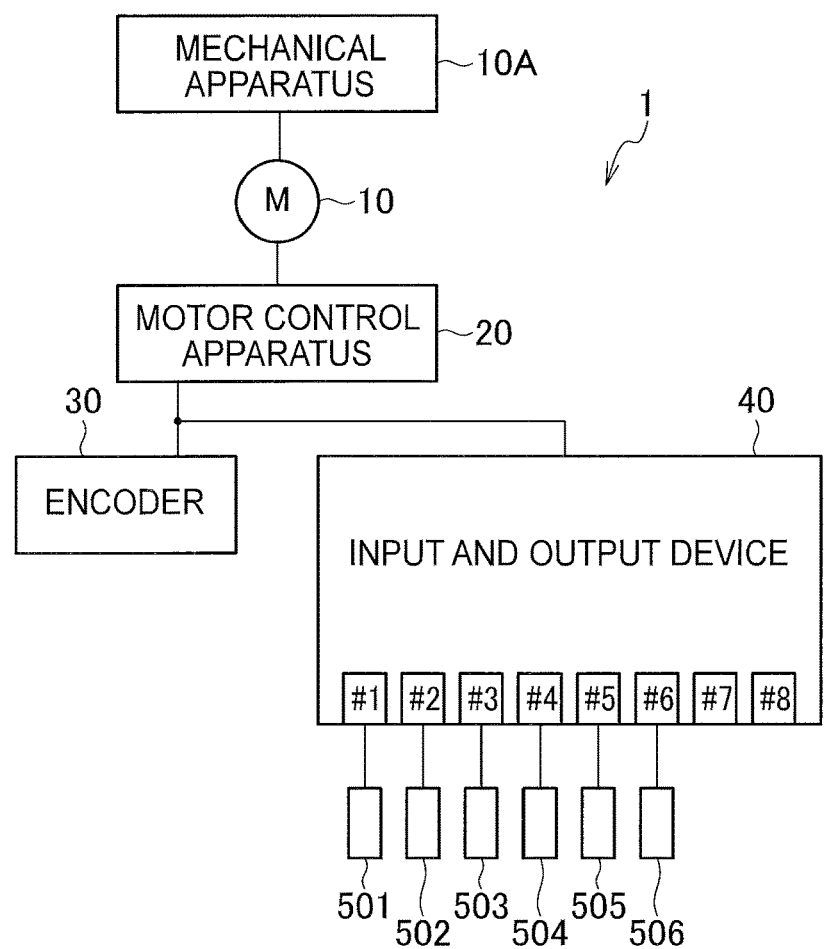
FIG. 1 is a schematic diagram illustrating an example of an overall configuration of a motor control system according to an embodiment.

As illustrated in FIG. 1, the motor control system 1 according to the embodiment of the present disclosure includes a mechanical apparatus 10A, a motor 10, a motor control apparatus 20, an encoder 30, an input and output device 40, and a plurality of sensors 501 to 506.

The motor control apparatus 20 is configured to control the motor 10. Specifically, the motor control apparatus 20 is a device including a computer that controls an amplifier unit that outputs a current, a voltage, and the like to the motor 10. That is, the motor 10 is configured to rotate in accordance with the voltage or the current applied from the motor control apparatus 20. The mechanical apparatus 10A is configured to be driven by the motor 10. For example, a robot corresponds to the mechanical apparatus 10A.

Generally, the motor control apparatus 20 that controls a servomotor is called as a servo-controller, a servo-amplifier, or the like. The motor control apparatus 20 may be a device configured to control the motor 10, for example, may be an inverter.

The encoder 30 is a position detector configured to detect position information of the motor 10. The encoder 30 may be an optical encoder or a magnetic encoder, for example.

The encoder 30 is configured to transmit the position information of the motor 10 to the motor control apparatus 20.

In the embodiment, a case using the encoder 30 as the position detector is described as an example. The present disclosure can be applied to a case using a sensor (for example, resolver) capable of detecting the position information of the motor 10. Here, the encoder 30 may be a linear scale (linear encoder) used in a case where the motor 10 is a linear motor.

The motor 10 may be a rotary motor or a linear motor. Here, in a case where the motor 10 is a rotary motor, the above-described position information indicates a rotation angle. In a case where the motor 10 is a linear motor, the above-described position information indicates a linear position.

The input and output device 40 includes a plurality of input-and-output connectors #1 to #8 and is a general-purpose input and output unit that connects the sensors 501 to 506 and the like to other peripheral devices. The input and output device 40 is used for increasing an input-and-output connector which has been insufficient in the motor control system 1.

The input and output device 40 is configured to transmit information to the motor control apparatus 20. The information relates to at least any one of the mechanical apparatus 10A and the motor 10 and is input from peripheral devices connected to the input-and-output connectors #1 to #8.

The plurality of sensors 501 to 506 is configured to detect the information relating to at least any one of the mechanical apparatus 10A and the motor 10. A temperature sensor, a pressure sensor, a torque sensor, a vibration sensor, a limit switch sensor, a touch sensor, and an I/O device are assumed as the plurality of sensors.

The temperature sensor is a sensor configured to detect the temperature of at least any one of the mechanical apparatus 10A and the motor 10 or the temperature in the vicinity of the mechanical apparatus 10A or the motor 10. For example, a temperature measuring resistor type sensor or a thermocouple type sensor may be used as the temperature sensor.

The pressure sensor is a sensor configured to detect the pressure of at least any one of the mechanical apparatus 10A and the motor 10 or the pressure in the vicinity of the mechanical apparatus 10A or the motor 10. The pressure sensor is configured to measure the pressure with a pressure-sensitive element through a diaphragm (a stainless steel diaphragm, a silicon diaphragm, or the like) and to convert the measured pressure into an electrical signal and output the electrical signal.

The torque sensor is a sensor configured to detect a torque of at least any one of the mechanical apparatus 10A and the motor 10. For example, the torque sensor may be a non-contact type torque sensor or a contact type torque sensor.

The information relating to the motor 10 means information which is not position information of the motor 10 among types of information regarding the state of the motor 10. The information relating to at least any one of the mechanical apparatus 10A and the motor 10 is information changing in accordance with the state of at least any one of the mechanical apparatus 10A and the motor 10. For example, this information may be information which can be detected by the sensors 501 to 506.

For example, the information relating to the motor 10 is information of the torque of the motor 10, the temperature of the motor 10, a position of an object such as an arm, which is moved by the motor 10, pressure on the object, or the state (for example, temperature) of the sensors 501 to 506 that detect the above items.

The information relating to the motor 10 is used for an output control of the motor 10 or for adjusting a control parameter or is used for determining whether or not a problem occurs in the motor 10 or predicting a lifespan (remaining period) of the motor 10.

In the embodiment, a case where the six sensors 501 to 506 are connected to the input and output device 40 is described as an example. The present disclosure can be applied to a case where sensors of which the number is not six are connected to the input and output device 40 or a case where a peripheral device other than the sensor is connected to the input and output device 40.

In the motor control system 1 according to the embodiment, communication paths between the encoder 30 and the motor control apparatus 20 and between the input and output device 40 and the motor control apparatus 20 are configured to be the same as each other. That is, in the motor control system 1 according to the embodiment, the motor control apparatus 20, the encoder 30, and the input and output device 40 are configured to be connected in series (daisy chain shape).

In the motor control system 1 according to the embodiment, the sensors 501 to 506 is configured to be not connected to the motor control apparatus 20 and but connected to the input-and-output connectors #1 to #8 of the input and output device 40.

Here, the position information of the motor 10 is configured to be transmitted from the encoder 30 to the motor control apparatus 20. The information relating to the motor 10 is configured to be transmitted from the sensors 501 to 506 to the motor control apparatus 20 through the input and output device 40.

An example of a flow of processing performed in the motor control system 1 according to the embodiment will be described below with reference to FIGS. 2, 3A, 3B and 3C.

Figure 2:
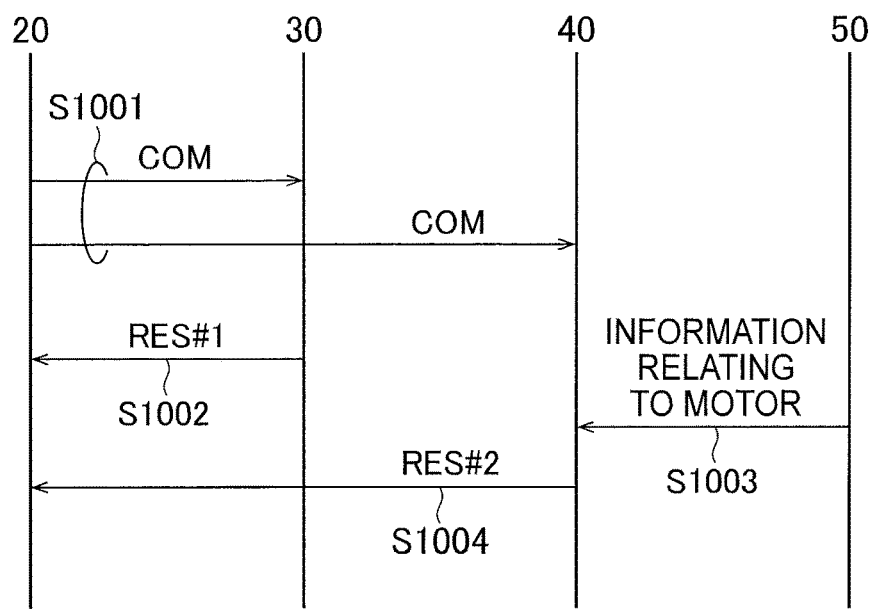
FIG. 2 is a diagram illustrating an example of a flow of processing performed in the motor control system according to the embodiment.

As illustrated in FIG. 2, in Step S1001, the motor control apparatus 20 transmits "COM" to the encoder 30 and the input and output device 40. "COM is data for an instruction to transmit the position information of the motor 10 and the information relating to the motor 10.

In Step S1002, the encoder 30 transmits "RES #1" to the motor control apparatus 20. "RES #1" is data including the position information of the motor 10.

In Step S1003, the input and output device 40 acquires the information relating to at least any one of the mechanical apparatus 10A and the motor 10 from the sensors 501 to 506. In Step S1004, the input and output device 40 generates "RES #2" based on the information relating to at least any one of the mechanical apparatus 10A and the motor 10. "RES #2" is data including the information relating to at least any one of the mechanical apparatus 10A and the motor 10. The input and output device 40 transmits "RES #2" to the motor control apparatus 20.

Here, the sensors 501 to 506 may detect the information relating to at least any one of the mechanical apparatus 10A and the motor 10 at a predetermined timing, or may detect the information relating to at least any one of the mechanical apparatus 10A and the motor 10 in accordance with an instruction from the input and output device 40.

Similarly, the sensors 501 to 506 may transmit the information relating to at least any one of the mechanical apparatus 10A and the motor 10 to the input and output device 40 at a predetermined timing. The sensors 501 to 506 may transmit the information relating to at least any one of the mechanical apparatus 10A and the motor 10 to the input and output device 40 in accordance with the instruction from the input and output device 40.

Figure 3A:
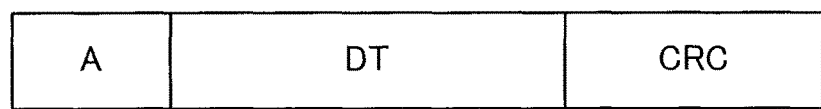
FIGS. 3A to 3C are diagrams illustrating an example of a format of data used in the motor control system according to the embodiment.
Figure 3B:
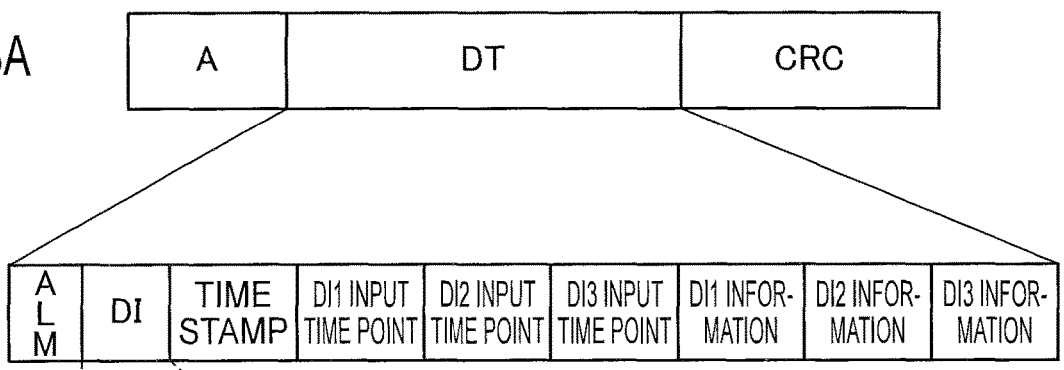
Figure 3C:
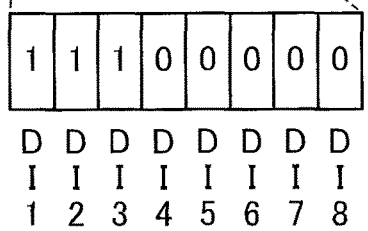

FIGS. 3A to 3C illustrate an example of a format of "RES #2". As illustrated in FIG. 3A, the format of "RES #2" has an address portion "A", a data portion "DT", and a check code portion "CRC".

The address portion "A" is configured to store transmission source information of "RES #2". For example, the address portion "A" may be configured to store an address of the input and output device 40 that transmits "RES #2", as the transmission source information.

The address portion "A" may be configured to store destination information of "RES #2". In this case, the address portion "A" may be configured to store an address of the motor control apparatus 20 as the destination information.

Code information used for detection of an erroneous code in "RES #2" is stored in the check code portion "CRC". Various well-known methods can be applied to the erroneous code detection. For example, cyclic redundancy check of any number of bits may be used.

The data portion "DT" is configured to store the information relating to at least any one of the mechanical apparatus 10A and the motor 10, which has been detected by the sensors 501 to 506, a time point at which the information relating to at least any one of the mechanical apparatus 10A and the motor 10 has been detected, and the like.

For example, as illustrated in FIG. 3B, the data portion "DT" may be configured to store "ALM", "DI (Digital Inputs)", "time stamp", "DI1 input time point", "DI2 input time point", "DI3 input time point", "DI1 information", "DI2 information", and "DI3 information".

Alarm codes indicating abnormality information of the input and output device 40 or abnormality information of the sensors 501 to 506 connected to the input and output device 40 are stored in "ALM".

A flag indicating an input state of the peripheral device such as the sensor, which is connected to the input-and-output connectors #1 to #8 of the input and output device 40 is stored in "DI". For example, in a case where a flag corresponding to the input-and-output connector #1 of the input and output device 40 is "1", the flag indicates that a limit switch sensor connected to the input-and-output connector #1 is in an ON state. In a case where the flag is "0", the flag indicates that the limit switch sensor is in an OFF state.

In the example in FIG. 3C, the DI1 to DI8 correspond to the input-and-output connectors #1 to #8, and the peripheral device such as the sensor is connected to the input-and-output connectors #1 to #3 (DI1 to DI3).

"Time stamp" is configured to store a time point at which "RES #2" has been generated. "Time stamp" may be configured to store a time point at which "RES #2" has been transmitted by the input and output device 40, instead of the time point at which "RES #2" has been generated.

"DI1 input time point" to "DI3 input time point" are configured to store a time point at which the information relating to at least any one of the mechanical apparatus 10A and the motor 10 has been detected by the sensor connected to the input-and-output connectors #1 to #3 of the input and output device 40. "DI1 input time point" to "DI3 input time point" may be configured to store a time point at which the information relating to at least any one of the mechanical apparatus 10A and the motor 10, which has been detected by the sensor connected to the input-and-output connectors #1 to #3 of the input and output device 40 has been received by the input and output device 40.

"DI1 input time point" to "DI3 input time point" are configured to store the information relating to at least any one of the mechanical apparatus 10A and the motor 10, which has been detected by the sensor connected to the input-and-output connectors #1 to #3 of the input and output device 40.

In the embodiment, a case where "DI1 input time point" to "DI3 input time point" and "DI1 information" to "DI3 information" relating to all the sensors connected to the input-and-output connectors #1 to #3 of the input and output device 40 are stored in the data portion "DT" is described as an example. The present disclosure can be applied to a case where only "DIx input time point" and "DIx information" relating to some of the plurality of sensors connected to the input-and-output connector #x of the input and output device 40 are stored in the data portion "DT".

In the motor control system 1 according to the embodiment, it is possible to randomly set a region of the data portion "DT", in which "DIx input time point" and "DIx information" are stored.

According to the motor control system 1 in the embodiment, the input and output device 40 is configured to put the information relating to at least any one of the mechanical apparatus 10A and the motor 10, which has been detected by the plurality of sensors 501 to 506, into "RES #2" and transmit the information to the motor control apparatus 20. Thus, connecting the plurality of sensors in a high-speed communication is possible.

According to the motor control system 1 in the embodiment, it is possible to reduce the number of wires in the motor control apparatus 20 or the plurality of sensors 501 to 506 configured to detect the information relating to at least any one of the mechanical apparatus 10A and the motor 10.

REFERENCE SIGNS LIST

1 . . . motor control system
10 . . . motor
10A . . . mechanical apparatus
20 . . . motor control apparatus
30 . . . encoder
40 . . . input and output device
1-#8 . . . input-and-output connector
501-506 . . . sensor

The invention claimed is:
1. A motor control system comprising:
a mechanical apparatus configured to be driven by a motor;
a position detector configured to detect position information of the motor;
circuitry configured to control the motor;
at least one sensor configured to detect information relating to at least one of the mechanical apparatus and the motor;
an input and output device including input-and-output connectors;
the position detector and the input and output device being connected to the circuitry through a same communication path;
the at least one sensor being connected to the input-and-output connectors of the input and output device;
the position information being configured to be transmitted from the position detector to the circuitry; and
the information relating to the at least one of the mechanical apparatus and the motor being configured to be transmitted from the input and output device to the circuitry through the same communication path with being unified in one data, after being outputted from each of the at least one sensor to the input and output device, wherein the input and output device is configured to generate the one data and transmit the one data to the circuitry, the one data including the information relating to the at least one of the mechanical apparatus and the motor, and a time point at which the information relating to at least one of the mechanical apparatus and the motor has been detected, and the one data further includes at least one of a time stamp at which the one data was generated and a time stamp at which the one data was transmitted by the input and output device.

2. An input and output device comprising:

a plurality of input-and-output connectors configured to be connected to at least one sensor configured to detect information relating to at least one of a motor and a mechanical apparatus configured to be driven by the motor;

the input and output device being configured to be connected to a circuitry through a same communication path as a communication path of a position detector configured to detect position information of the motor; and the input and output device being configured to transmit the information relating to at least one of the mechanical apparatus and the motor, which has been acquired from each of the at least one sensor, to the circuitry through the communication path with unifying in one data, wherein the input and output device is configured to generate the one data and transmit the one data to the circuitry, the one data including the information relating to the at least one of the mechanical apparatus and the motor, and a time point at which the information relating to at least one of the mechanical apparatus and the motor has been detected, and the one data further includes at least one of a time stamp at which the one data was generated and a time stamp at which the one data was transmitted by the input and output device.

3. A motor control system comprising:

a mechanical apparatus configured to be driven by a motor;

a position detector configured to detect position information of the motor;

circuitry configured to control the motor;

at least one sensor configured to detect information relating to at least one of the mechanical apparatus and the motor;

an input and output device including input-and-output connectors;

the position detector and the input and output device being connected to the circuitry through a same communication path;

the at least one sensor being connected to the input-and-output connectors of the input and output device;

the position information being configured to be transmitted from the position detector to the circuitry; and the information relating to the at least one of the mechanical apparatus and the motor being configured to be transmitted from the input and output device to the circuitry through the same communication path with being unified in one data, after being outputted from each of the at least one sensor to the input and output device, wherein the input and output device is configured to generate the one data and transmit the one data to the circuitry, the one data including the information relating to the at least one of the mechanical apparatus and the motor, and a time point at which the information relating to at least one of the mechanical apparatus and the motor has been detected, and the position detector is configured to directly transmit the position information from the position detector to the circuitry.

* * * * *